United States Patent
Costa et al.

(10) Patent No.: US 6,668,170 B2
(45) Date of Patent: Dec. 23, 2003

(54) MOBILE RADIO TELECOMMUNICATIONS SYSTEM WITH SYNCHRONIZED HANDOVER

(75) Inventors: Mauro Costa, Pavia (IT); Michael Roberts, Essex (GB); Sutha Sivagnanasundaram, London (GB)

(73) Assignee: Lucent Technologies Inc., Murray Hill, NJ (US)

( * ) Notice: Subject to any disclaimer, the term of this patent is extended or adjusted under 35 U.S.C. 154(b) by 429 days.

(21) Appl. No.: 09/729,897

(22) Filed: Dec. 5, 2000

(65) Prior Publication Data

US 2001/0046218 A1 Nov. 29, 2001

(30) Foreign Application Priority Data

Dec. 10, 1999 (EP) .............................................. 99309986

(51) Int. Cl.[7] ................................................. H04Q 7/20
(52) U.S. Cl. ....................... 455/439; 455/436; 455/440; 455/452; 455/456; 455/502; 370/328; 370/331; 370/338; 370/350; 370/401; 370/501
(58) Field of Search ................................. 455/436, 440, 455/439, 452, 456, 502, 503; 370/328, 331, 338, 350, 401, 501, 512

(56) References Cited

U.S. PATENT DOCUMENTS

| | | | | |
|---|---|---|---|---|
| 5,020,058 A | * | 5/1991 | Holden et al. ............... | 370/474 |
| 5,440,561 A | * | 8/1995 | Werronen .................... | 370/337 |
| 5,912,877 A | * | 6/1999 | Shirai et al. ................. | 370/228 |
| 5,940,371 A | * | 8/1999 | Mitts et al. .................. | 370/236 |
| 6,125,125 A | * | 9/2000 | Narasimha et al. .......... | 370/510 |
| 6,144,658 A | * | 11/2000 | Lebizay et al. .............. | 370/352 |
| 6,246,878 B1 | * | 6/2001 | Wallentin .................... | 455/442 |
| 6,321,090 B1 | * | 11/2001 | Soliman ...................... | 455/440 |
| 6,466,556 B1 | * | 10/2002 | Boudreaux ................... | 370/331 |
| 6,519,457 B1 | * | 2/2003 | Jiang et al. .................. | 455/442 |
| 6,535,979 B1 | * | 3/2003 | Vialen et al. ................ | 713/163 |

FOREIGN PATENT DOCUMENTS

EP         0 676 908 A2    10/1995   ............ H04Q/7/38

OTHER PUBLICATIONS

European Search Report, dated May 4, 2000.

* cited by examiner

*Primary Examiner*—William Trost
*Assistant Examiner*—Danh C Le

(57) ABSTRACT

In a mobile radio network such as the Universal Mobile Telephone System, for handover or relocation of control of a mobile from a serving RNC 22 to a target RNC 24, the TRNC 24 sends a request to the SRNC 22 over the Iur link 27, and the SRNC 22 returns frame timing information. The TRNC 24 synchronizes the user plane with the SRNC for this uplink, so that both controllers are able to send the same packets in synchronizm. The core network (10) can suppress the duplicated packet.

11 Claims, 3 Drawing Sheets

MOBILE RADIO TELECOMMUNICATIONS SYSTEM WITH SYNCHRONIZED HANDOVER

BACKGROUND OF THE INVENTION

CROSS-REFERENCE TO RELATED APPLICATION

This application claims priority of European Patent Application No. 99309986.0, which was filed on Dec. 10, 1999.

1. Field of the Invention

This invention relates to a mobile radio telecommunications system, such as a Universal Mobile Telephone System or the Global System for Mobile Communications, and relates especially to a system providing real time services.

2. Description of the Related Art

In a real time service, it is important that uplink packets, that is packets passing to a mobile system from the control network, are neither duplicated nor lost. If a packet is duplicated, then the upper control layers must deduce which packet to discard; if a packet is lost, it must be retransmitted and if retransmission is imperative, this is usually carried out in the application layer and the retransmission requires radio resource.

Some real time services, such as video, are delay-sensitive and/or loss sensitive. Packet loss and packet duplication can seriously affect the ability to provide such services. Packet loss and packet duplication are especially likely to be experienced during a handover or relocation from one control network to another as the mobile user moves on the ground.

In this specification, the terms "handover" and "relocation", which mean the transfer of control of a connection from a serving Radio Network Controller (RNC) to a target RNC, are used interchangeably.

In a mobile radio telecommunications system it is at present not possible to avoid packet loss or packet duplication during handover or relocation.

It is an object of the invention to provide a system in which the risk of packet loss or packet duplication during handover is substantially reduced.

SUMMARY OF THE INVENTION

According to the invention in a mobile radio telecommunications system, a method of handing over control of a mobile from a serving controller to a target controller, characterized by the steps of:

the target controller sending to the serving controller a request for timing information;

the serving controller sending timing information to the target controller;

the target controller coming into user plane synchronization with the serving controller for this mobile connection;

and the target controller taking control of the mobile.

Preferably the timing information is frame timing information.

Also according to the invention, a controller for a mobile radio telecommunications system arranged, on handover of control of a mobile to that controller, to send a request for timing information to a serving controller; to receive timing information from the serving controller; to come into user plane synchronization with the serving controller for this mobile connection; and to take control of the mobile; and further arranged, on handover of control from that controller to a target controller and on receipt of a request signal, to send to that target controller signal timing information.

BRIEF DESCRIPTION OF THE DRAWINGS

The invention will be described by way of example only with reference to the accompanying drawing in which.

DETAILED DESCRIPTION

Figure 1:
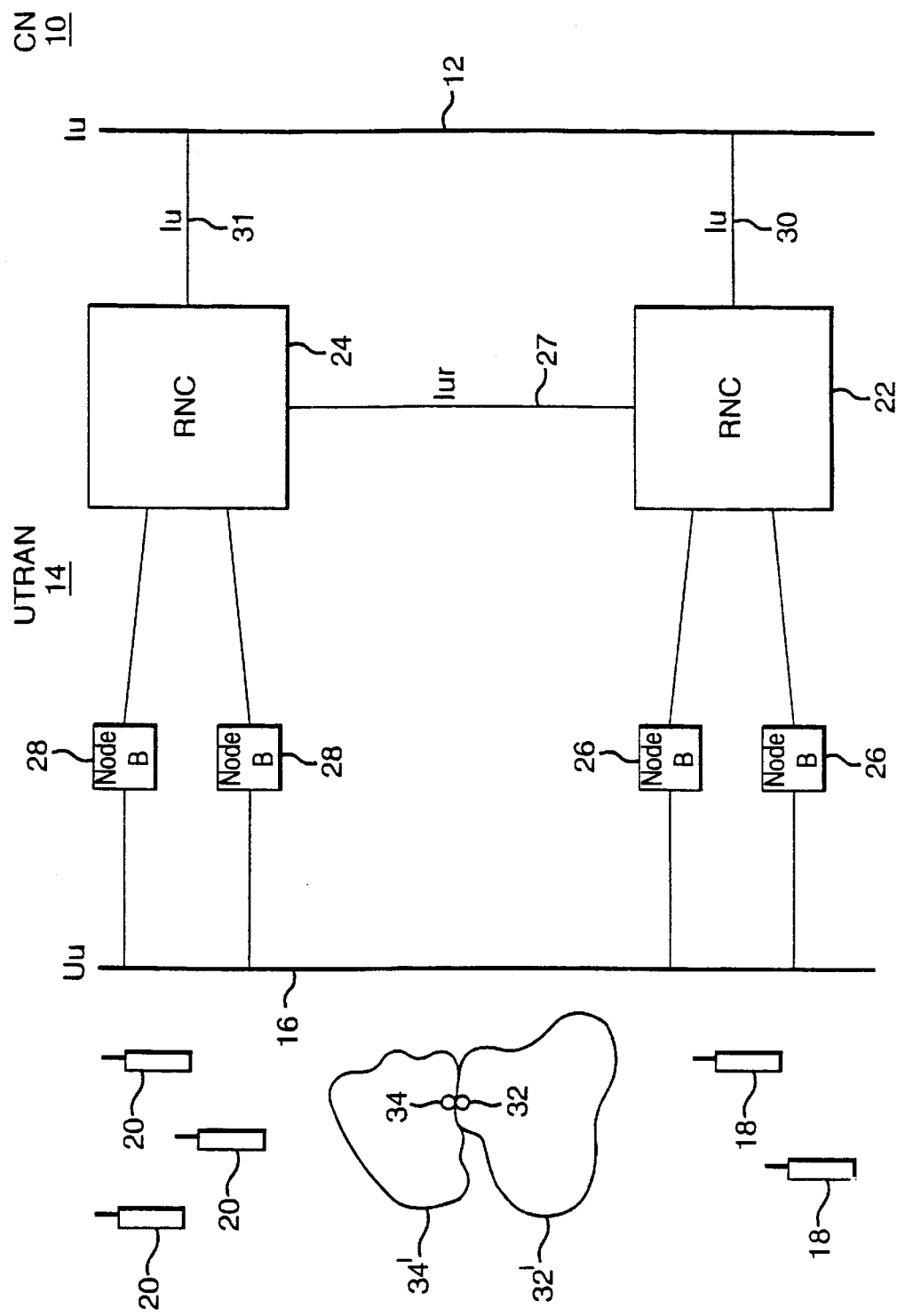
FIG. 1 illustrates schematically a part of the Universal Mobile Telephone System.

In FIG. 1, a Core Network (CN) 10 has an interface 12, the Iu interface, to the UMTS Terrestrial Radio Access Network (UTRAN) 14, and the UTRAN 14 has an interface 16, the Uu interface, to a number of Mobile Systems (MSs) 18, 20.

Within the UTRAN 14 are a number of Radio Network Controllers (RNC) 22, 24, two only being illustrated, each RNC controlling a number of Node Bs 26, 28, two only being shown for each RNC. RNC 22 controls the MSs 18 and RNC 24 controls the MSs 20. The RNCs 22, 24 are connected to each other by an interface Iur 26 and to the Core Network 10 by Iu interfaces 30, 31.

In the Figure, the network is the UMTS network; in a GSM network the equivalent building block to an RNC is termed a Base Station Controller (BSC); a Node B is termed a Base Transceiver Station (BTS); and the Uu interface is termed the radio interface.

The RMCs 22, 24 build frames containing data, send the frames to a Node B 26, 28 and control a mobile system as it moves over the ground. A Node B receives frames from an RNC, and modulates the data for passage to the radio interface Uu 16 and thence to a mobile.

The UMTS is specified to have a control plane and a user plane; the control plane provides control signalling between Node Bs and RNCs, to control the allocation of requests for resources, and to control handover requests. The user plane is responsible for handling the actual user data passed between applications.

Suppose one of the mobiles is located in a telecommunications cell 32 just within the group of cells 32' controlled by the RNC 22, and moves into a telecommunications cell 34 located just within the group of cells 34' controlled by the RNC 24. At the position illustrated, the mobile, whether in cell 32 or in cell 34, can receive signals from and send signals to either RNC 22 or RNC 24, via the relevant Node B 26 or 28.

Suppose the mobile is moving upwards in the figure. As it moves and a handover occurs from RNC 22 to RNC 24, it is essential to synchronize the frames if real time services are to be supported such that no duplication of data is detected by the application. At present, handover information is passed from the serving controller (SRNC) 22 to the target controller (TRNC) 24 via the CN 10; SRNC 22 sends a "handover required" signal over Iu link 30 to CN 10 which sends a "handover request" signal to TRNC 24 over Iu link 31; TRNC returns a handover request acknowledgement 35, and the CN 10 performs a handover. With frames now passing via RNC 24, synchronization is eventually reached, but there is often a noticeable loss or duplication of packets which is perceived by the application and causes noticeable disturbance to the application, for example, in a video, a loss of synchronization and/or a jittering display.

Figure 2:
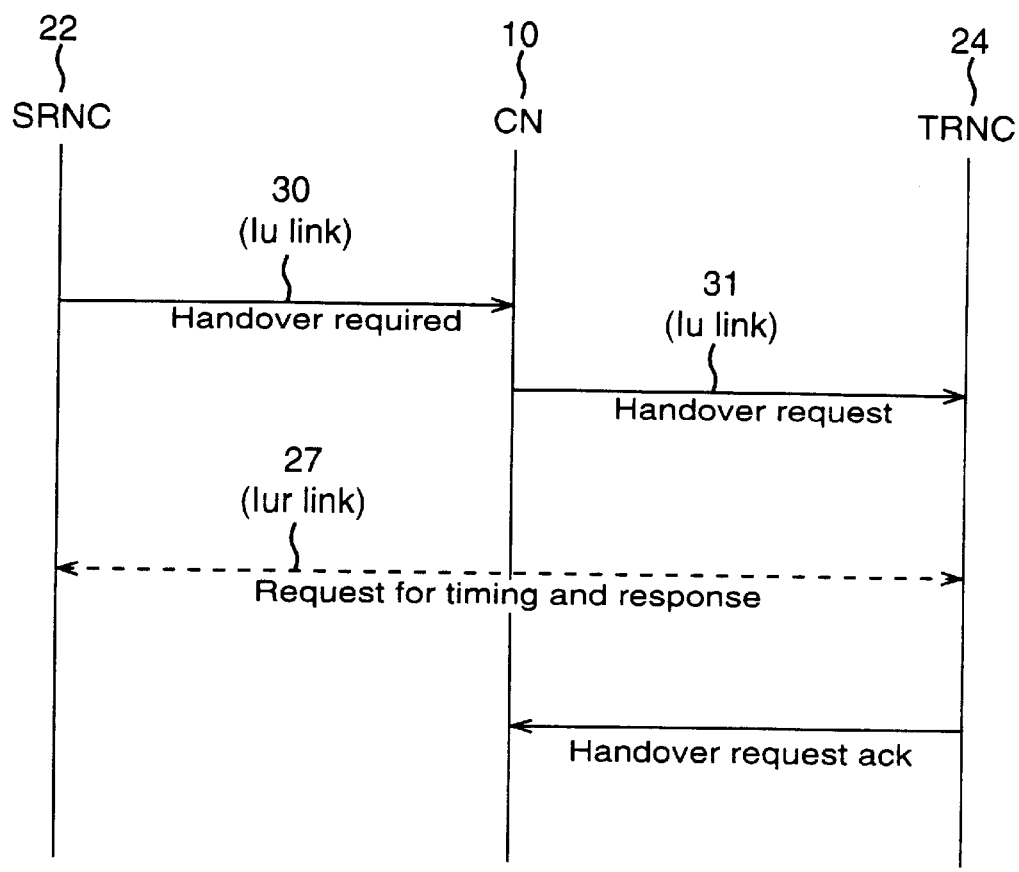
FIG. 2 illustrates the signalling control flow during handover.

In the method of the invention, when the TRNC 24 receives the handover request signal from the CN 10, it sends over the Iur link 27 a request for timing information from the SRNC 22 related to its frames; the SRNC 22 then sends over the link Iur 27 its low layer timing and synchronization and protocol; provisioning timing offset; and synchronization information. The signals are illustrated in FIG. 2.

Once synchronization information is exchanged, the two RNCs 22, 24 are able to send synchronously the same packet from the mobile in cell 32/34 on the Iu interface links 30, 31 to the CN 10. The TRNC 24 sends the Handover Request Acknowledgement signal. The CN 10 can then permit the handover or relocation to RNC 24.

During the handover or relocation, the CN 10 is able to determine which packets are being repeated, and to suppress the repetition.

The signals send over the Iur link 27 maybe out-of-band, but for minimum delay, in-band signalling is preferred.

It is to be understood that Iur link is at present used by the SRNC 22 to send a request to the TRNC 24; in the inventive method, the TRNC 24 sends a request in the opposite direction to that conventionally used, and considerable additional information is then sent over the link.

Figure 3:
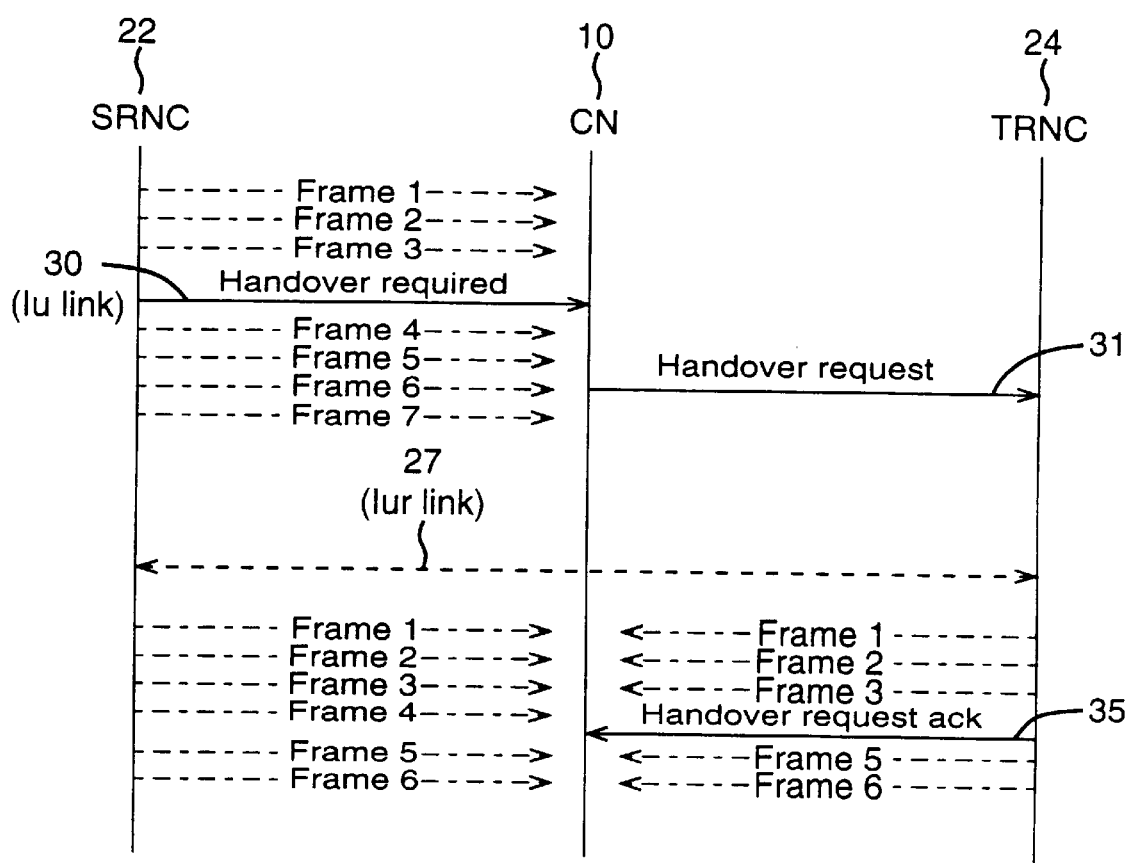
FIG. 3 illustrates the counting of frames.

FIG. 3 shows the counting of Iu frames in the user plane and indicates the signal paths.

The SRNC 22 sends frames, shown chain-dotted, to the CN 10 via the Iu uplink user plane; the SRNC also sends the "handover required" signal to the CN via Iu signalling, shown by a full line. The CN sends the "handover request" signal to the TRNC via Iu signalling (full line) 31.

The low level timing and synchronization of the Iu signals are sent via the Iur link 27, shown dotted. The TRNC changes its timing for the mobile in cell 32/34 only to come into synchronization with the SRNC.

Subsequently the SRNC and the TRNC both send frames from the mobile in cell 32/34; it will be seen from FIG. 3 that frames 1 and 2 are not synchronized; frames 3 are synchronized, and the TRNC can then send its "handover request acknowledgement" signal 35 to the CN via Iu signalling (full line). Frames 5 and 6 are shown to be synchronized, and sent by both RNCs. The CN 10 prevents repetition of the information.

The method of the invention, of sequencing/synchronization on the Iu interface, allows the CN 10 to perform near lossless switching between two uplink packet streams. Quality of Service on handover is greatly improved.

The inventive method can be applied to relocation as well as to RNC handover, and can be applied to GSM as well as to UMTS.

As is conventional, the CN 10 comprises at least one Mobile Switching Centre (MSC) and a plurality of GSM Support Nodes, one of which will be the Serving GSM Support Node (SGSN) for a call in progress.

What is claimed is:

1. A method of handing over control of communications with a mobile terminal from a serving controller to a target controller in a mobile telecommunications system, the method comprising the steps of:
   the target controller sending to the serving controller a request for timing information,
   the serving controller sending timing information to the target controller,
   the target controller coming into user plane synchronisation with the serving controller for the connection with this mobile terminal,
   the serving controller and the target controller sending synchronously to a core network the same packet from the mobile, the core network determining which packets are repeated and suppressing the repetition, and
   the target controller taking control of communications with the mobile.

2. The method according to claim 1 wherein the serving controller sends to the target controller frame information relating to packets on the uplink.

3. The method according to claim 2 wherein the frame information is low layer timing and synchronisation protocol, provisioning timing offset, and synchronisation information.

4. The method according to claim 1, wherein the mobile telecommunications system is a Universal Mobile Telecommunications System (UMTS), the target controller is a target radio network controller, the serving controller is a serving radio network controller.

5. The method according to claim 4 wherein the target and serving controllers come into synchronisation on their interface (Iu) with the core network of the system.

6. A mobile telecommunications system, comprising control of communications hand over means comprising a serving controller and a target controller,
   the target controller comprising means to send to the serving controller a request for timing information,
   the serving controller comprising means to respond to said request by sending timing information to the target controller,
   the target controller being operative to come into user plane synchronisation with the serving controller which is in connection with a mobile terminal,
   the serving controller and the target controller each comprising means to send synchronously to a core network the same packet from the mobile, the core network comprising means to determine which packets are repeated and means to suppress the repetition, and
   the target control comprising means to take control of the communications with the mobile.

7. The system according to claim 6, wherein the means to respond of the serving controller sends to the target controller timing information relating to packets on the uplink.

8. The system according to claim 6, wherein the system is a Universal Mobile Telecommunications System (UMTS), the target controller being a target radio network controller, the serving controller being a serving radio network controller, the target controller and serving controller being connected via a link (IuR) over which the request for timing information and the timing information are sent.

9. The system according to claim 6 further comprising means to bring the system into synchronisation on the interface (Iu) with a core network.

10. In a mobile radio telecommunications system, a method of handing over control of a mobile from a serving controller to a target controller, characterized by the steps of:
   the target controller sending to the serving controller a request for timing information;
   the serving controller sending timing information to the target controller;
   the target controller coming into user plane synchronization with the serving controller for this mobile connection; and the target controller taking control of the mobile, in which the serving controller sends to the target controller frame information relating to packets on the uplink, and in which the frame information is low layer timing and synchronization protocol, provisioning timing offset, and synchronization information.

11. A controller for a mobile radio telecommunications system arranged, on handover of control of a mobile to that controller, to send a request for timing information to a serving controller; to receive timing information from the serving controller; to come into user plane synchronization with the serving controller for this mobile connection; and to take control of the mobile; and further arranged, on handover of control from that controller to a target controller and on receipt of a request signal, to send to that target controller signal timing information, the controller being arranged to come into synchronization on the interface (Iu) with a core network, the controller being arranged to send and receive low layer timing and synchronization and protocol information, provisioning timing offset, and synchronization information.

* * * * *